(12) United States Patent
Shiota

(10) Patent No.: US 7,577,954 B2
(45) Date of Patent: Aug. 18, 2009

(54) PROCESS MANAGEMENT METHOD AND IMAGE FORMING APPARATUS

(75) Inventor: Noriyuki Shiota, Kawasaki (JP)

(73) Assignee: Ricoh Company Limited, Tokyo (JP)

( * ) Notice: Subject to any disclaimer, the term of this patent is extended or adjusted under 35 U.S.C. 154(b) by 409 days.

(21) Appl. No.: 11/142,456

(22) Filed: Jun. 2, 2005

(65) Prior Publication Data
US 2006/0036800 A1 Feb. 16, 2006

(30) Foreign Application Priority Data
Jun. 3, 2004 (JP) .............................. 2004-165978

(51) Int. Cl.
G06F 9/455 (2006.01)
G06F 9/46 (2006.01)
G06F 9/44 (2006.01)
G06F 15/177 (2006.01)
G06F 7/38 (2006.01)
G06F 9/00 (2006.01)

(52) U.S. Cl. ........................... 718/100; 717/168; 713/2; 712/244

(58) Field of Classification Search ................ 719/313; 718/1, 100; 711/100, 163; 710/28, 200; 726/2; 717/168; 712/244; 713/1–2
See application file for complete search history.

(56) References Cited

U.S. PATENT DOCUMENTS

| | | | |
|---|---|---|---|
| 5,001,662 A * | 3/1991 | Baum ............................ 708/625 |
| 5,218,712 A | 6/1993 | Cutler et al. |
| 5,588,152 A * | 12/1996 | Dapp et al. .................... 712/16 |
| 5,590,345 A * | 12/1996 | Barker et al. ................... 712/11 |
| 5,708,836 A * | 1/1998 | Wilkinson et al. ............. 712/20 |
| 5,948,097 A | 9/1999 | Glew et al. |
| 6,311,292 B1 * | 10/2001 | Choquette et al. ............. 714/30 |
| 6,708,231 B1 * | 3/2004 | Kitagawa ....................... 710/10 |
| 6,732,235 B1 * | 5/2004 | Krivacek et al. .............. 711/118 |
| 2002/0108028 A1 | 8/2002 | Nunoe |
| 2002/0120809 A1 * | 8/2002 | Machida et al. .............. 711/100 |

FOREIGN PATENT DOCUMENTS

| | | |
|---|---|---|
| JP | 01-092843 | 4/1989 |
| JP | 6-12327 | 1/1994 |
| JP | 09-097173 | 4/1997 |

OTHER PUBLICATIONS

Jay H. Byun, et al., "Formalizing Process Protection in Application Adaptive Reconfigurable Architectures", XP-002364310, Dec. 12, 1999, pp. 1-37.

"MIPS32 Architecture For Programmers vol. III: The MIPS32 Priveleged Resource Architecture" XP-002364311, Mar. 12, 2001, Cover pp. I-VI, pp. 1-143.

(Continued)

*Primary Examiner*—Li B Zhen
*Assistant Examiner*—Qing-Yuan Wu
(74) *Attorney, Agent, or Firm*—Oblon, Spivak, McClelland, Maier & Neustadt, P.C.

(57) ABSTRACT

Management of a process having a kernel mode and a user mode and executed on an operation system is performed by receiving a request for moving to a user system mode from a user process, and changing the user process into a kernel mode in response to the request.

1 Claim, 17 Drawing Sheets

CONFIGURATION CHART SHOWING FUNCTIONAL SECTION
CONTROLLING USER SYSTEM MODE & CONTROL REGISTER ENABLE MODE

OTHER PUBLICATIONS

"MIPS32 Architecture For Programmers vol. II: The MIPS32 Instruction Set", XP-002364610, Mar. 12, 2001, Cover pp. I-VI, pp. 1-245.
Masahiko Takahashi, et al., "Efficient Kernel Support of Fine-Grained Protection Domains for Mobile Code", Distributed Computing Systems, XP-010340561, May 31, 1999, pp. 64-73.
"MIPS SDE 5.03 Programmers' Guide", XP-002364312, Jan. 7, 2004, pp. 1-140.
Patent Abstracts of Japan, JP 11-120096, Apr. 30, 1999.
Patent Abstracts of Japan, JP 2000-022879, Jan. 21, 2000.
Patent Abstracts of Japan, JP 2000-261515, Sep. 22, 2000.
Patent Abstracts of Japan, JP 2001-086256, Mar. 30, 2001.
Patent Abstracts of Japan, JP 2001-105694, Apr. 17, 2001.
Patent Abstracts of Japan, JP 2002-007084, Jan. 11, 2002.
Patent Abstracts of Japan, JP 2002-124959, Apr. 26, 2002.
Patent Abstracts of Japan, JP 2002-158815, May 31, 2002.
Patent Abstracts of Japan, JP 2003-008821, Jan. 10, 2003.
Patent Abstracts of Japan, JP 2003-156578, May 30, 2003.
Patent Abstracts of Japan, JP 2003-173263, Jun. 20, 2003.
Patent Abstracts of Japan, JP 2004-213263, Jul. 29, 2004.
Patent Abstracts of Japan, JP 2004-340672, Dec. 2, 2004.
Patent Abstracts of Japan, JP 2003-316646, Nov. 7, 2003.
Patent Abstracts of Japan, JP 2003-316645, Nov. 7, 2003.
Patent Abstracts of Japan, JP 2003-337714, Nov. 28, 2003.
Patent Abstracts of Japan, JP 2003-316588, Nov. 7, 2003.
Patent Abstracts of Japan, JP 2005-078419, Mar. 24, 2005.
Patent Abstracts of Japan, JP 2005-111670, Apr. 28, 2005.
Kazutoshi Yokoyama, et al., "A mechanism for switching running mode of application programs", IPSJ SIG, Technical Report, ISSN 0919-6072, Notes, vol. 2004, No. 17, Feb. 25, 2004, pp. 25-32 (with English translation).
Koichi Konishi, et al., "Implementation and Performance of MPI on Cenju-3", IPSJ SIG, Notes, vol. 95, No. 28, ISSN 0919-6072, Mar. 9, 1995, pp. 97-104 (with English translation).

* cited by examiner

FIG. 1 BLOCK CHART SHOWING FUNCTIONAL CONFIGURATION OF IFA ACCORDING TO ONE EMBODIMENT OF THE PRESENT INVENTION

BLOCK CHART SHOWING HW CONFIGURATION OF IFA

CONFIGURATION CHART SHOWING DATA STORAGE SECTION IN PROCESS CONTROL BLOCK

CONFIGURATION CHART OF STATUS REGISTER IN CPU

FIG. 6

CHART SHOWING EXEMPLARY CONFIGURATION OF STATUS REGISTER IN CPU

| 31 | 28 | 27 | 26 | 25 | 24 | | 16 | 15 | 8 | 7 | 6 | 5 | 4 | 3 | 2 | 1 | 0 |
|---|---|---|---|---|---|---|---|---|---|---|---|---|---|---|---|---|---|
| CU | | 0 | FR | RE | | DS | | IM | | KX | SX | UX | KSU | ERL | EXL | IE |

| 24 | 23 | 22 | 21 | 20 | 19 | 18 | 17 | 16 |
|---|---|---|---|---|---|---|---|---|
| 0 | BEV | 0 | SR | 0 | CH | 0 |

FLOWCHART SHOWING PROCESSING OF USER MODE SETTING SECTION

FLOWCHART SHOWING PROCESSING OF USER SYSTEM MODE SETTING SECTION

FLOWCHART SHOWING TRANSITION TO CONTROL REGISTER ENABLE MODE & RETURNING PROCESSING TO ORDINAL USER MODE

CHART SHOWING EXEMPLARY STORAGE REGION OF FONT ROM OF PRINTER

CHART SHOWING EXEMPLARY DATA STORAGE REGION OF I/O APPARATUS

FIG. 15

CHART SHOWING EXEMPLARY PROGRAM
FOR MEASURING EXECUTION TIME PERIOD (a)
```
func ( )
{
    gettimeofday (&tv1, NULL) ;          ← 162
    . . .
    . . .
    gettimeofday (&tv2, NULL) ;          ← 163
    EXECUTION TIME PERIOD = tv2 – tv1 ;  ← 164
    . . . .
}
```
← 161

(b)
```
func ( )
{
    tv1 = read_countreg ( ) ;            ← 166
    . . .
    . . .
    tv2 = read_countreg ( ) ;            ← 167
    EXECUTION TIME PERIOD = tv2 – tv1 ;  ← 168
    . . . .
}
```
← 165

CHART SHOWING INSTRUMENT CONFIGURATION USED WHEN REMOTE ROM IS UPDATED

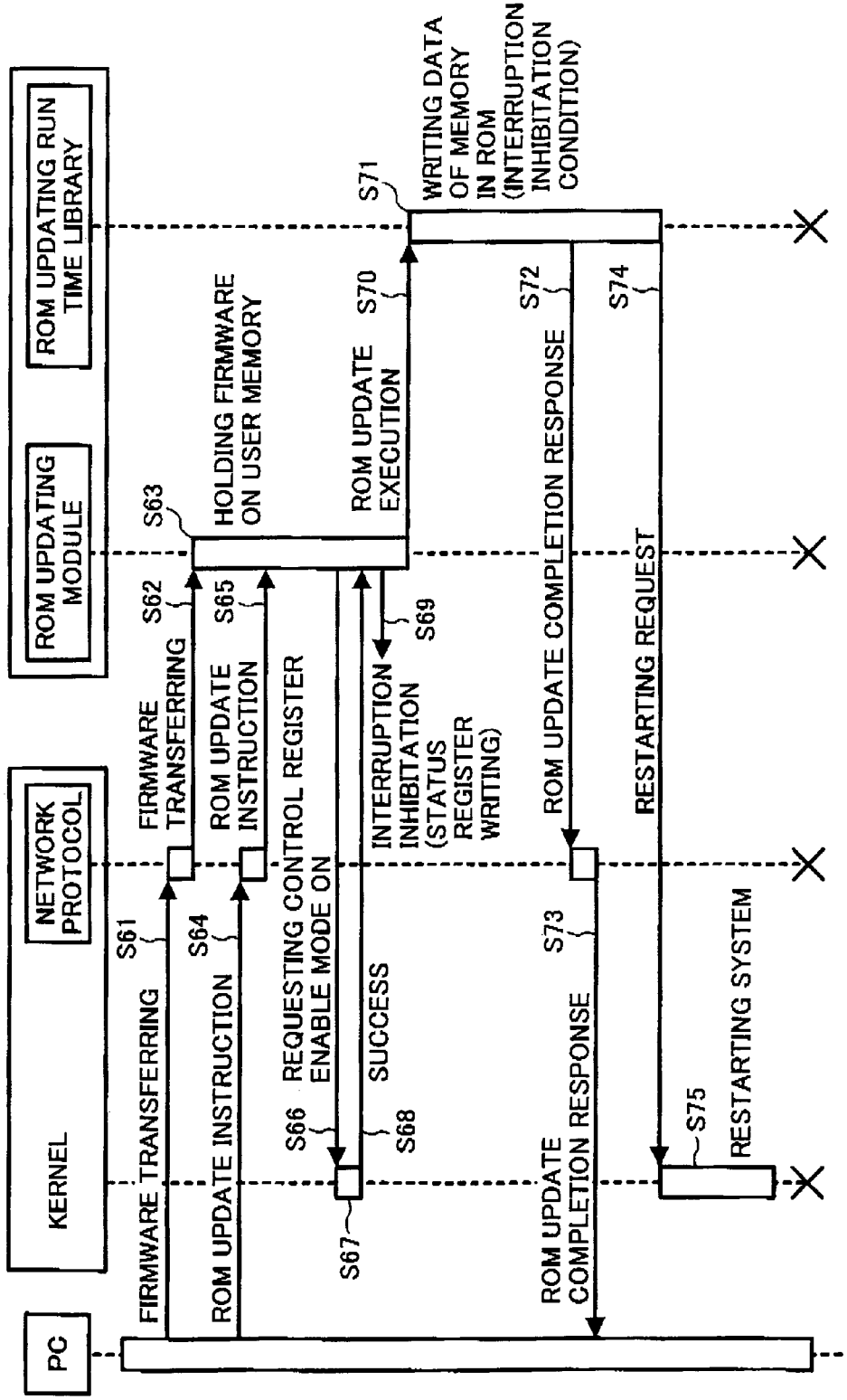
FIG. 18 CHART SHOWING SEQUENCE OF PROCESSING OF REMOTE ROM UPDATING

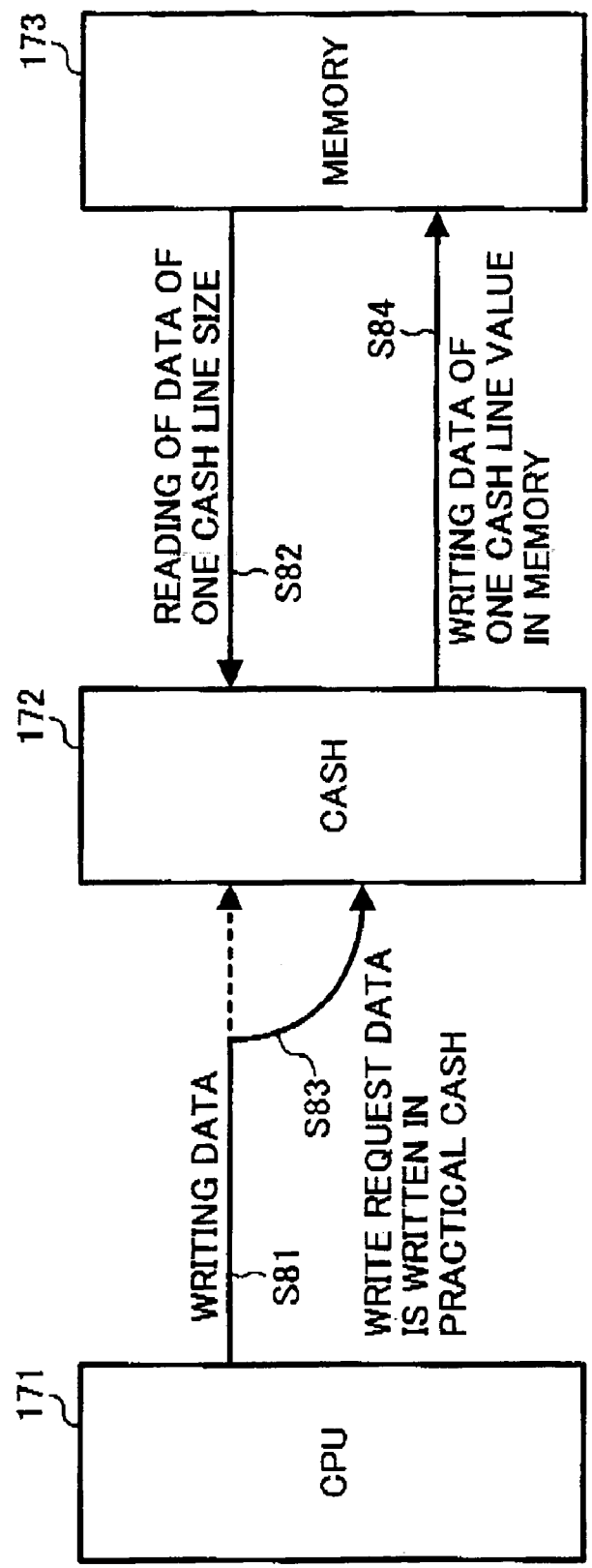

PROCESS MANAGEMENT METHOD AND IMAGE FORMING APPARATUS

CROSS REFERENCE TO THE RELATED APPLICATION

This application claims priority under 35 USC §119 to Japanese Patent Application No. 2004-165978 filed on Jun. 3, 2004, the entire contents of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to a process control method and an image forming apparatus capable of increasing a freedom degree of processing.

2. Discussion of the Background Art

Recently, an image forming apparatus, such as a multifunctional machine, etc., including various functions, such as a copier, a facsimile, a printer, a scanner, etc., has technically advanced. Such a multifunctional machine has been almost always formed by combining various components, such as a copier, a facsimile, a printer, a scanner, etc. However, each of the various components is expected to have a sophisticated function and to be merged and used. Further, in accordance with a recent advance in networking, an affinity with networking becomes increasingly important.

However, there is conventionally a practical limit to merge each of the functions. However, since a future multifunctional machine requires combination of various sophisticated components, software for controlling thereof also becomes sophisticated and complex, accordingly.

In accordance with such complexity of the software, an OS (Operating System) for controlling the software comes to lack functions if only including a multitask monitor, and is needed to include a memory protection function using a virtual memory, and a controlling function for controlling an execution authority based on a user mode or a kernel mode in view of system stability and development efficiency. To meet such needs, a UNIX (TM) or a UNIX compatible OS recently comes to be used as an OS for control software even in a built-in instrument, such as a multifunctional machine, etc.

Such an OS becomes rich in protection functions. For example, an independent virtual space is assigned to all of processes, and another process or a kernel region is inhibited to be accessed. Further, a user process is controlled to operate in a user mode of a CPU, and a privilege instruction is inhibited to execute, and accessing to a region is restricted except for accessing in a kernel mode. Further, it is common in the UNIX (TM) type OS that a function is extended in view of increasing a security.

Even though, the UNIX (TM) type OS are excellent due to various substantial protection functions, they cause the following problems when such an OS is used in a built-in instrument, such as an image forming apparatus, etc.

The first problem relates to a memory access. This is caused because memory access is restricted in a user mode, and thus addresses cannot be freely accessed. In general, this function is advantageous, but is deficiency when implemented in a built-in instrument. For example, there is a demand to access to a font ROM of a printer and a data region of an I/O apparatus in order to readily confirm a performance of software in a developing step thereof. However, since the accessing needs passage through a special device driver, creation and installation of the special device driver are needed in a system, thereby causing difficulty. However, it is too much to entirely freely allow accessing to a memory in view of security, and there is a demand to enable such free access upon need.

The second problem relates to continuous execution. This is caused because an interruption inhibiting condition cannot be designated by freely handling an interruption mask located in a status register of a CPU. Specifically, execution of a user mode can be interrupted by a hardware in a user process. However, it can be restriction when usage of built-in instrument is guaranteed to be continuous. For example, when a firmware stored in a ROM arranged in an instrument is remotely updated via a network, continuous execution is needed to avoid a malfunction, which is caused when a current processing is moved to the other process. However, it is not easy because external hardware interruption cannot be inhibited. In such a situation, separate provision of a system call that inhibits interruption can be one of solutions. However, an overhead of the system call is too large to use when frequently switching between interruption inhibition and permission as a problem.

The third relates to a cache handling problem. This is caused because an instruction to invalidate a cache in order to increase a writing speed into a memory region is a privilege instruction that is unusable directly from the user process. For example, when copying and clearing a large memory region during depiction processing of a printer or the like, a processing speed is increased by causing cache contents of a writing destination to be "invalid" using a "cache" instruction. However, since the "cache" instruction is a privilege instruction, the user process cannot execute it, and a "write allocate" processing (i.e., processing executed when memory contents are read into a cache in a cache line unit), executed when an ordinal cache is effective, is unexpectedly executed. As a result, new data is needlessly read during copying and clearing, thereby decreasing a speed.

It can resolve such problems that a system call is added to either copy or clear a large region. However, since context switching does not occur unless "tsleep ( )" is voluntarily called and the context switching is executed during execution of the system call, the context switching is impossible during when copying and clearing processing, which takes a long time period, are executed. If a process having a highly urgent level becomes to be executable, context switching to this process is not performed as a problem.

SUMMARY

Accordingly, an object of the present invention is to address and resolve such and other problems and provide a new and improved method and an image forming apparatus including an OS having a kernel mode and a user mode each having a different execution authority. In a preferred embodiment, a request receiving device is provided to receive a request for changing a mode to a user system mode from a user process, which executes processing related to image formation. A mode changing device is provided to change a mode of the user process to a kernel mode in response to the request are provided.

In another embodiment, a request receiving device is provided to receive a request for changing a mode to a control register enable mode from a user process, which executes processing related to image formation. A device is further provided to enable the user process to directly access to a control register in response to the changing request are included.

BRIEF DESCRIPTION OF DRAWINGS

A more complete appreciation of the present disclosure and many of the attendant advantages thereof will be readily obtained as the same becomes better understood by the following detailed description when considered in connection with the accompanying drawings, wherein:

FIG. 6 illustrates another exemplary status register arranged in the CPU;

FIG. 15 illustrates exemplary program that measures an execution time period;

FIG. 18 illustrates an exemplary sequence of processing executed when the ROM is remotely updated; and FIG. 19 illustrates exemplary cache processing executed when an image memory is cleared.

PREFERRED EMBODIMENTS OF THE PRESENT INVENTION

Figure 1:
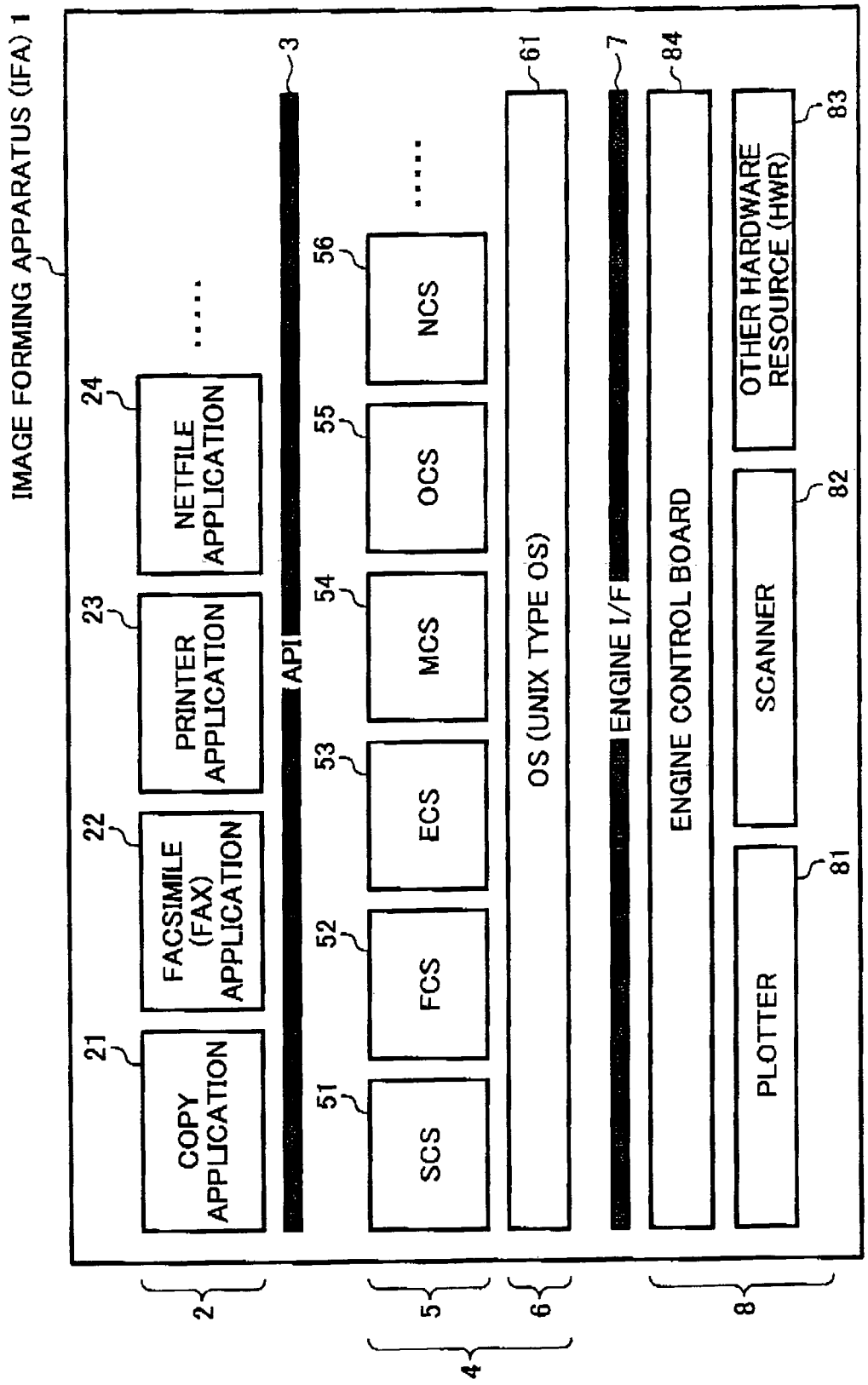
FIG. 1 illustrates an exemplary functional construction of an image forming apparatus according to one embodiment of the present invention.

Referring now to the drawings, wherein like reference numerals designate identical or corresponding parts throughout several views, in particular in FIG. 1, an exemplary functional construction of an image forming apparatus is illustrated according to one embodiment of the present invention.

As shown, an image forming apparatus 1 includes an application layer 2, a platform layer 4, and an engine section 8. An interface 3 serves as an interface (API), provided by a platform layer 4, with the application layer 2. An interface 7 serves as an interface (an engine I/F) provided between the platform layer 4 and the engine section 8.

The application layer 2 includes a software group each executes individual processing in the image forming apparatus 1. Thus, the application layer 2 includes a copy application 21 as an application for copy use, a facsimile application 22 as an application for facsimile use, a printer application 23 as an application for printer use, and a net file application 24 as an application for net file use that executes communications of files via a network.

The platform layer 4 includes a software group that provides the applications of the application layer 2 with a common service function via the interface 3, and is divided into a service layer 5 and an OS layer 6. The service layer 5 includes a SCS 51 having a plurality of functions, such as application management, operation section control, system screen displaying, LED displaying, resource management, interruption control, etc., a FCS 52 that provides API of a facsimile function, and an ECS 53 that controls the engine section. Also included are a MCS 54 that controls a memory, an OCS 55 that controls an operation section (e.g. an operation panel) serving as an interface with an operator, and a NCS 56 that provides a commonly available service to applications that need network inputting and outputting. The OS layer 6 includes an OS 61 of the UNIX (TM) type.

The engine section 8 includes a plurality of engines for a plotter 81, a scanner 82, and another hardware resource 83 or the like, and an engine control board 84 that controls these engines.

Figure 2:
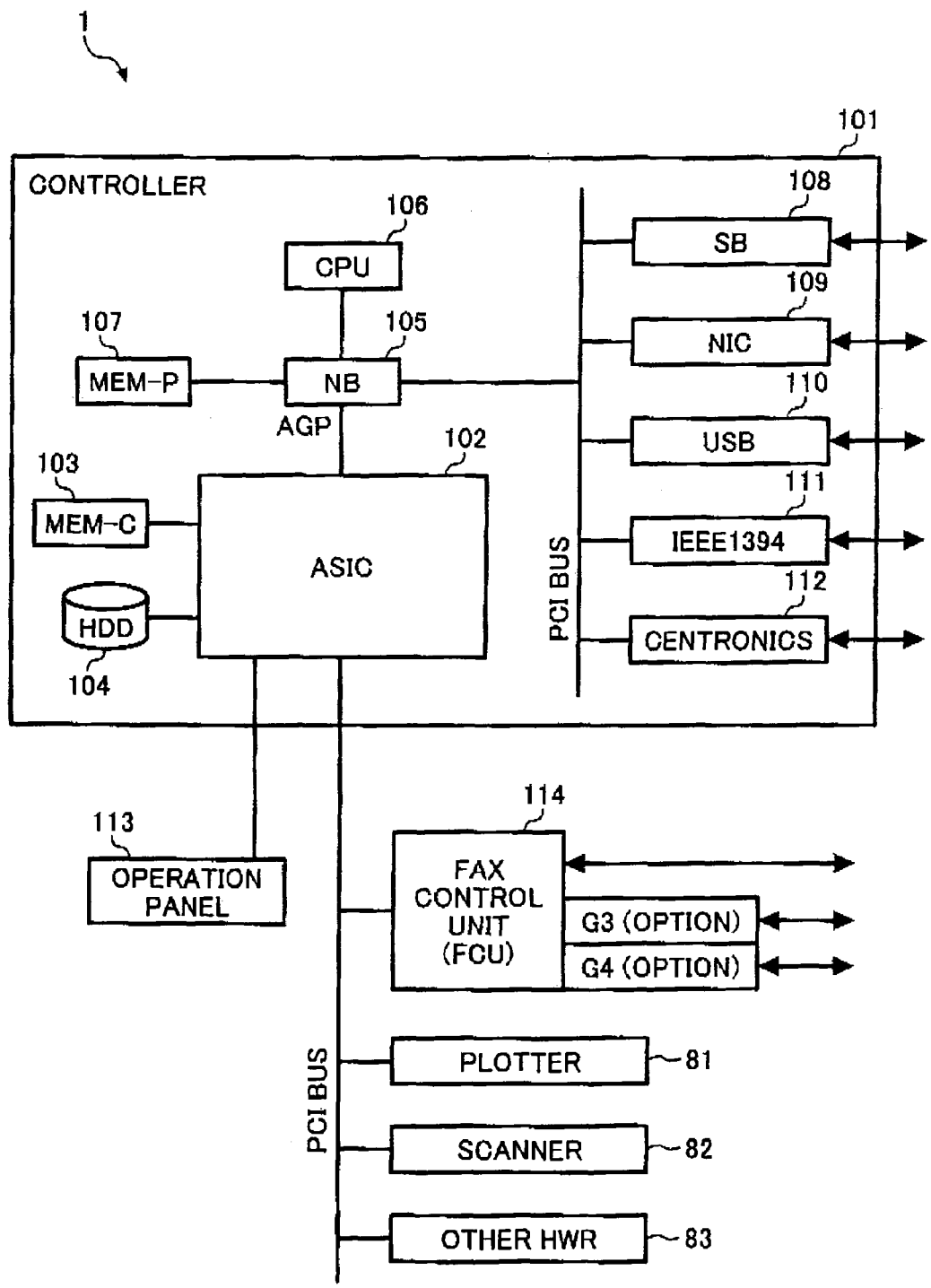
FIG. 2 illustrates an exemplary hardware construction of the image forming apparatus according to one embodiment of the present invention.

FIG. 2 illustrates an exemplary hardware construction of the image forming apparatus 1 illustrated in FIG. 1 according to one embodiment of the present invention.

As shown, the image forming apparatus 1 includes a controller 101 that executes a main control performance, an operation panel 113, a facsimile control unit 114, a plotter 81, a scanner 82, and another hardware resource 83 each connected to the controller 101.

The controller 101 is formed such that a CPU 106 serving as an IC for general control use is connected to an ASIC 102 serving as an IC for image processing use via a NB 105 serving as a bridge. Further, a SB 108 serving as a bridge to enable connection with peripheral devices, a NIC 109 that controls network communications, and a USB 110 that provides a USB interface are connected to a bus (PIC BUS) of a NB 105. Further, an IEEE 1394 111 that provides an IEEE 1394 interface, and a centronics 112 that provides a centronics interface are connected the bus (PIC BUS). In addition, a MEM-C 103 and a HDD 104 are connected to the ASIC 102 as memory apparatuses, while a MEM-P 107 is connected to the NB 105 as a memory apparatus.

Figure 3:
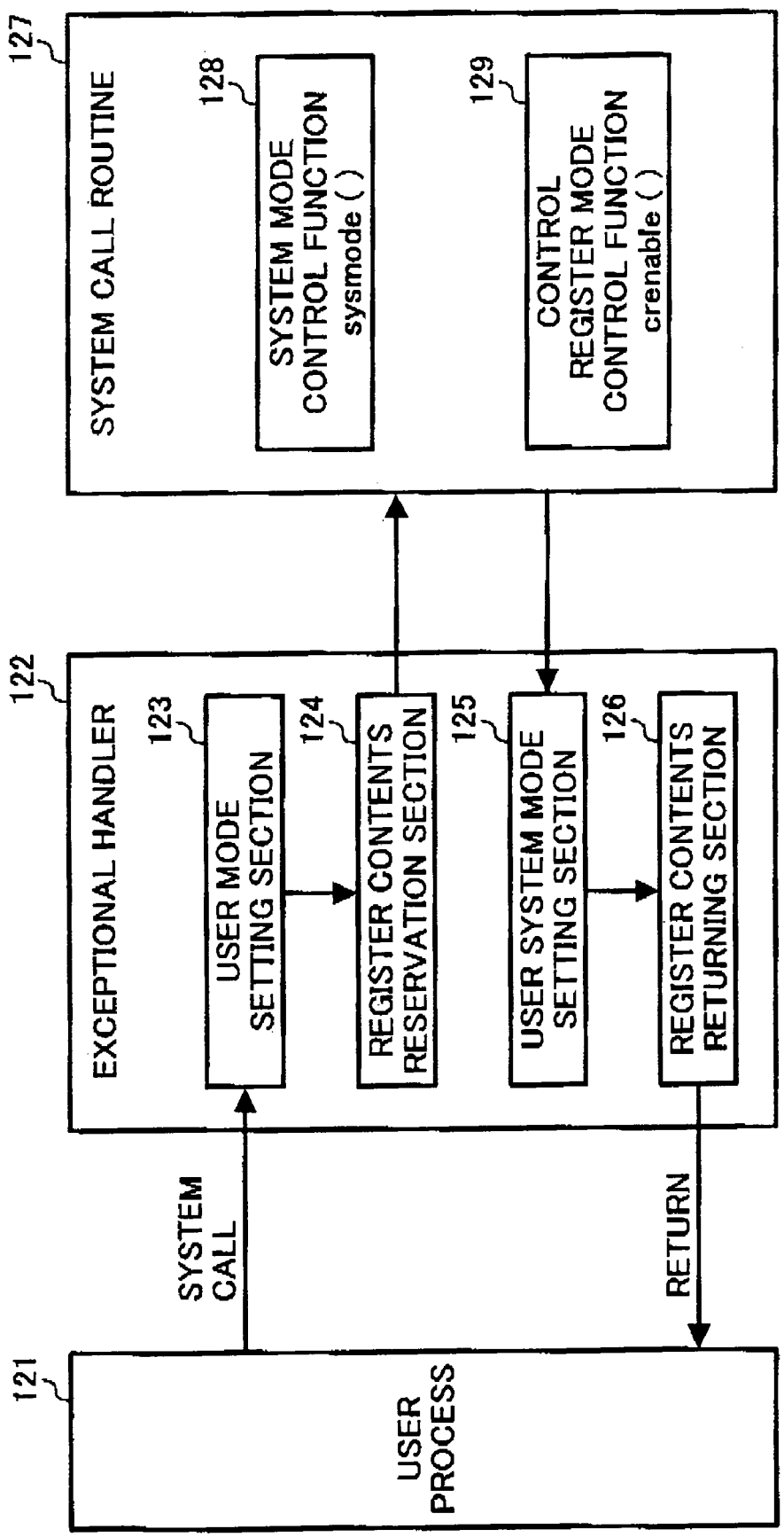
FIG. 3 illustrates an exemplary configuration of a functional section that controls a user system mode and a control register enable mode.

FIG. 3 illustrates an exemplary configuration of a functional section that controls a user system mode and a control register enable mode newly employed in one embodiment of the present invention, wherein the user system mode represents a mode in which addresses and status registers or the like can be optionally accessed and a privilege instruction can be freely executed in a user process. Further, a control register enable mode represents a mode in which accessing to a status register or the like can be freely executed in a user process.

As shown, a user mode setting section 123 and a user system mode setting section 125 are newly employed in addition to a register content storing section 124 and a register content returning section 126, each arranged as a standard equipment, in an exceptional handler 122 that handles a system call transmitted from a user process 121. Further, a system mode control function 128 and a control register mode control function 129 are newly employed as a system call routine 127 executed via the exceptional handler 122.

The register content storing section 124 stores register contents of a CPU into a process control block arranged in a user construction member when a system call exception occurs. The register content returning section 126 returns contents stored in the process control block to the register of the CPU when the system call is terminated. The user mode setting section 123 is enabled to be executed before processing of the register content storing section 124 and to only operate when a user system mode is returned to an ordinal user mode. The user system mode setting section 125 is enabled to be executed before processing of the register content returning section 126 and only to operate when an ordinal user mode is changed to a user system mode. Details of processing are described later, but the reason why the user mode setting section 123 and the user system mode setting section 125 are arranged is to suppress inconvenience possibly caused when a system call routine 127 is executed. The user mode setting section 123 and the user system mode setting section 125 do not any processing in controlling in a control register enable mode.

Even though the user mode setting section 123 and the user system mode setting section 125 are exemplified as a functional section arranged in the exception handler 122, those can be arranged on a separate module. For example, the user mode setting section 123 can be arranged between an exit of the user process 121 and an inlet of the exception handler 122, which is located on the side of the user process 121. Further, the user system mode setting section 125 can be arranged between an exit of a system call routine 127 and an inlet of the exception handler 122, which is on the side of the system call routine 127.

Figure 4:
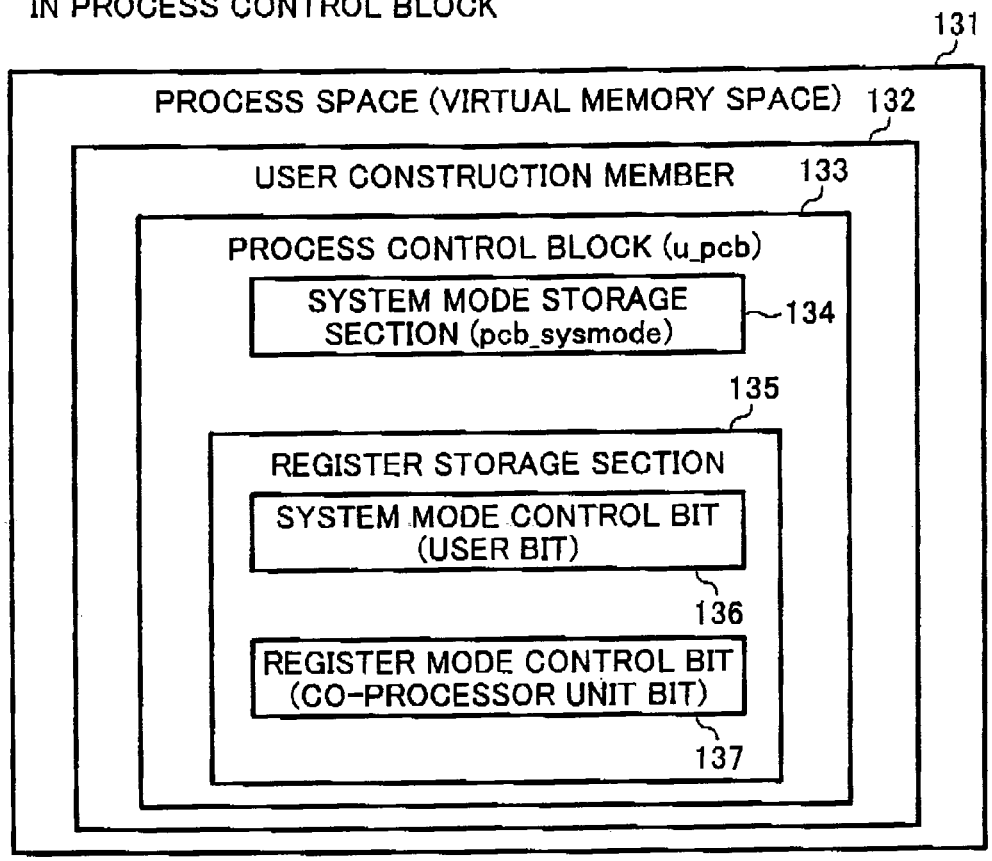
FIG. 4 illustrates an exemplary data storage section arranged in a process control block.

FIG. 4 illustrates an exemplary configuration of a data storage section arranged in a process control block to be accessed during processing. As shown, a system mode storage section 134 is newly employed in a process control block 133 arranged in the user construction member 132 of a process space 131 to indicate a system mode. A register storage section 135 is arranged as a standard equipment to store register contents of a CPU and indicates a system mode control bit 136 and a register mode control bit 137, mainly used in processing in this embodiment, among the storage data.

Figure 5:
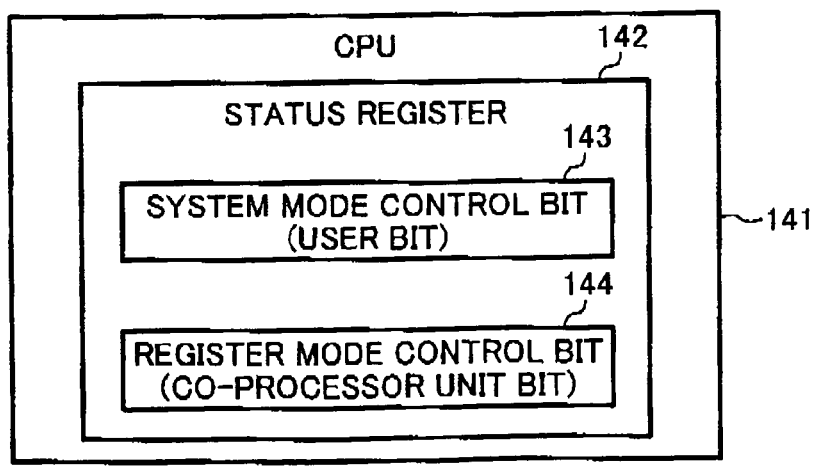
FIG. 5 illustrates an exemplary status register arranged in a CPU.

FIG. 5 illustrates an exemplary status register arranged in a CPU, and in particular, a system mode control bit 143 and a register mode control bit 144 mainly used in processing in this embodiment. The system mode control bit 136 and the register mode control bit 137 correspond to the system mode control bit 143 and the register mode control bit 144, respectively.

FIG. 6 illustrates an exemplary configuration of a status register arranged in a CPU, and in particular, a practical bit arrangement in a MIPS type CPU (a commodity name: T x 49), wherein numbers indicate bit positions. As shown, a field "KSU" located at bit positions 4 to 3 corresponds to the system mode control bit 143, wherein a bit value "10" represents a user mode, and a bit value "00" represents a kernel mode. Further, a bit position 28 in a field "CU" located at bit positions 31 to 28 corresponds to the register mode control bit 144, wherein a bit value "0" represents unavailableness of a register of the CPU, and a bit value "1" represents availableness thereof.

Figure 7:
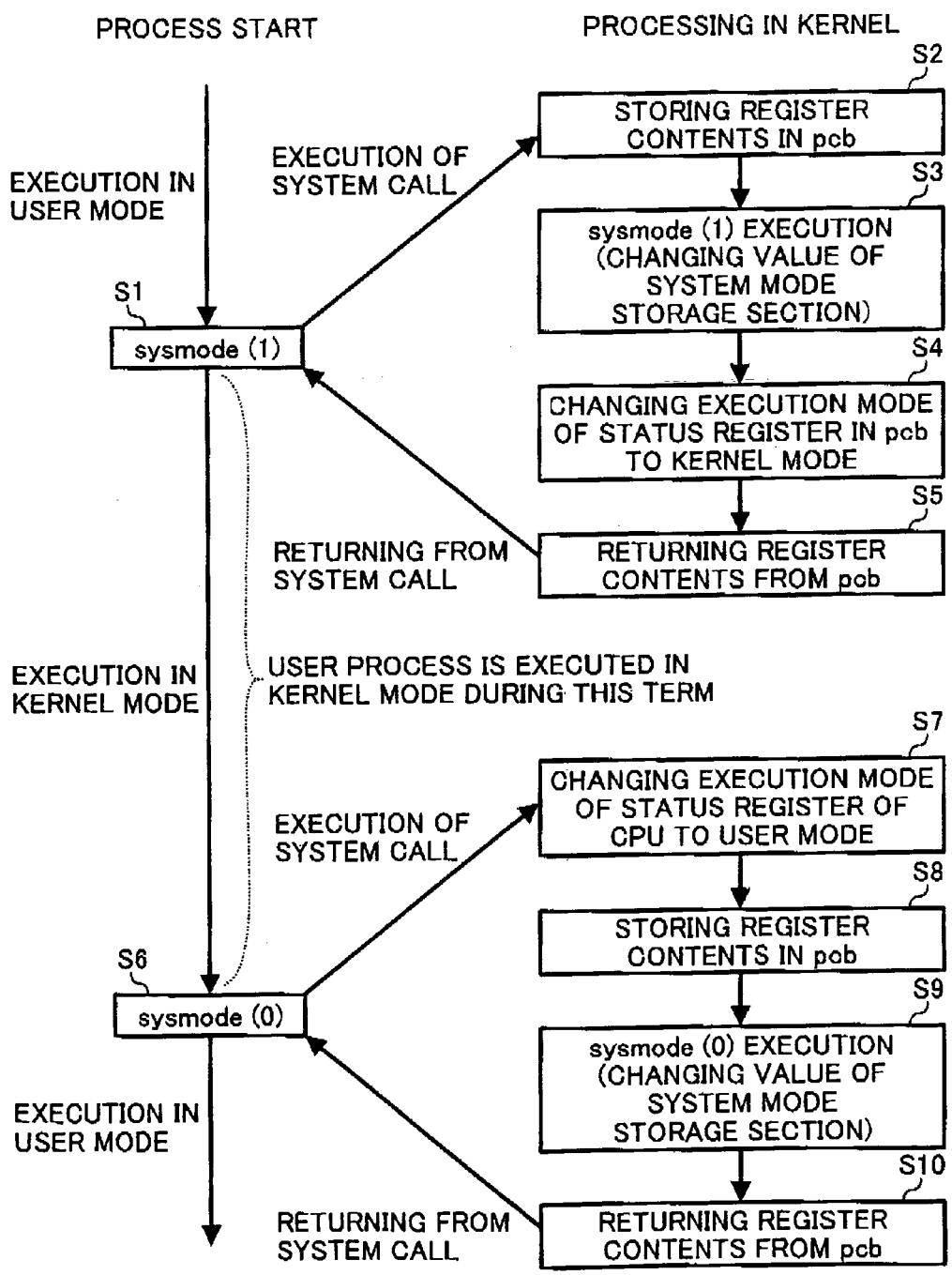
FIG. 7 illustrates exemplary processing executed when a mode is moved to a user system mode and returned to a user mode.

FIG. 7 illustrates exemplary processing executed when a process moves to a user system mode and returns to a user mode.

As shown, when a user process is desired to move to a user system mode in the process of the user mode, a system call of "sysmode (1)" corresponding to a system mode control function 128 is performed in step S1.

In response, the exception handler 122 performs processing. However, the user mode setting section 123 does not execute any processing at this time, and the next register content storing section 124 stores register contents of a CPU 141 in a register storage section 135 of a process control block 133 in step S2.

Subsequently, a system mode control function 128 of a system call routine 127 is executed, and changes a value of a system mode storage section 134 in step S3. More specifically, the value "2" is given to the system mode storage section 134 (pcb_sysmode) as processing of sysmode 1 to start processing of the next user system mode setting section 125.

Subsequently, the processing returns to the exception handler 122, and the user system mode setting section 125 changes a system mode control bit 136, included in the process control block 133, into a prescribed value to represent a kernel mode in step S4. Simultaneously, the value "1" is given to the system mode storage section 134 (pcb_sysmode) to represent that it is currently a user system mode.

Then, the register content returning section 126 returns the register contents of the CPU 141 from the process control block 133 and thereby returning the processing to a user process in step S5.

Thus, movement to the user system mode is completed, and the user process is executed substantially in the kernel mode thereafter. As a result, an address of a memory and a status register or the like can be optionally accessed, and a privilege instruction can be freely executed.

Subsequently, when a user system mode is to be returned to an ordinal user mode, a system call of "sysmode (0)" corresponding to a system mode control function 128 is executed in step S6.

In response, the exception handler 122 executes processing, and the user mode setting section 123 changes a system mode control bit 143 included in the CPU 141 to a prescribed value that indicates a user mode in step S7. Simultaneously, the value "2" is given to the system mode storage section 134 (pcb_sysmode).

Subsequently, the register content storing section 124 stores register contents into a register storage section 135 of the process control block 133 in step S8.

Then, the system mode control function 128 of the system call routine 127 is executed, and changes a value of the system mode storage section 134 in step S9. More specifically, the value "0" is given to the system mode storage section 134 (pcb_sysmode) to indicate an ordinary user mode as processing of "sysmode zero".

Subsequently, the processing returns to the exception handler 122. The user system mode setting section 125, however, does not execute anything at this time. The next register content returning section 126 returns register contents of the CPU 141 from the process control block 133 in step S10, and returns to the user process. Thus, a process returns to the ordinal user process.

Figure 8:
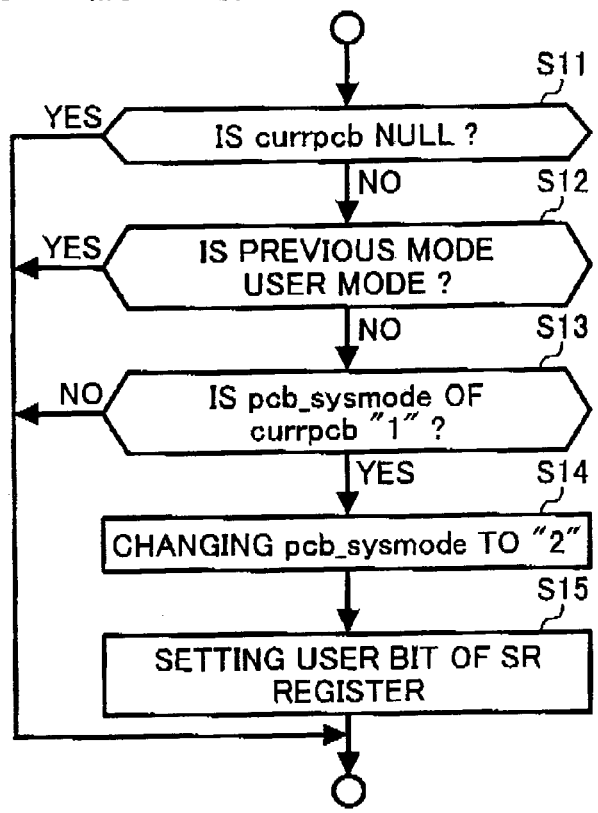
FIG. 8 illustrates exemplary processing executed by a user mode setting section.
Figure 9:
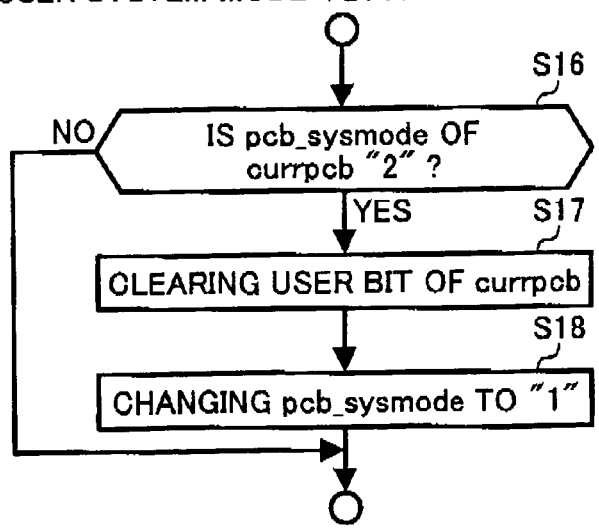
FIG. 9 illustrates exemplary processing executed by a user system mode setting section.

FIG. 8 illustrates exemplary processing executed by the user mode setting section 123 illustrated in FIG. 3, while FIG. 9 illustrates exemplary processing executed by the user system mode setting section 125.

In FIG. 8, the user mode setting section 113 initially determines if a process control block (currpcb) of a current process is NULL in step S11. If the determination is positive (i.e., NULL), the user mode setting section 113 does not execute any processing and terminates a process so that malfunctions can be suppressed during an idling condition in which no process starts.

If the determination is negative (i.e., the process control block (currpcb) of the current process is not NULL), the user mode setting section 113 determines if the previous mode is a user mode by checking the system mode control bit 143 (e.g. USER bit) of the status register 142 in step S12. If it is the user mode, the user mode setting section 113 does not execute any processing due to needless of piling the user modes.

Subsequently, the user mode setting section 123 checks a current value of the system mode storage section 134 (pcb_sysmode) in step S13. If the value is other than "1", the user mode setting section 113 does mot executes any processing to suppress malfunctions caused in the mode other than the user system mode.

If the value of system mode storage section 134 (pcb_sysmode) is "1", the user mode setting section 113 changes the value into "2" in step S14, and sets a value of the system mode control bit 143 (e.g. a USER bit) of the status register 142 in step S15. Then, the user mode setting section 113 terminates the processing. This is executed to pretend as if an ordinary user mode is changed to the subsequent system call routine 127.

Due to these performances, processing thereafter is dealt as an exception occurred in a user mode by setting up the system mode control bit 143 (e.g. a USER bit) only in a case of being operated in the user system mode (i.e., only when a USER bit of a CPU 141 is cleared and pcb_sysmode is given the value "1"). Thus, it is possible to return to a user mode, when a process is returned to the user process 121.

Subsequently, the user system mode setting section 125 checks a current value of the system mode storage section 134 (pcb_sysmode) in step S116. If it is other than "2", the user mode setting section 113 does not execute any processing, so that malfunctions can be suppressed by executing processing only when "sysmode (1)" is executed in the system call routine 127 and accordingly the pcb_sysmode becomes "2".

Then, when the pcb_sysmode is given the value "2", the user system mode setting section 125 clears storage of the smpb 136 (e.g. a USER bit) in step S17, and sets the value "1" to the system mode storage section 134 (pcb_sysmode) in step S18.

Thus, when processing is entered when the value "2" is set to the system mode storage section 134 (pcb_sysmode) (i.e., when processing is entered after "sysmode (1)" is executed in the system call routine 127), a process returns to the user process with a kernel mode.

Figure 10:
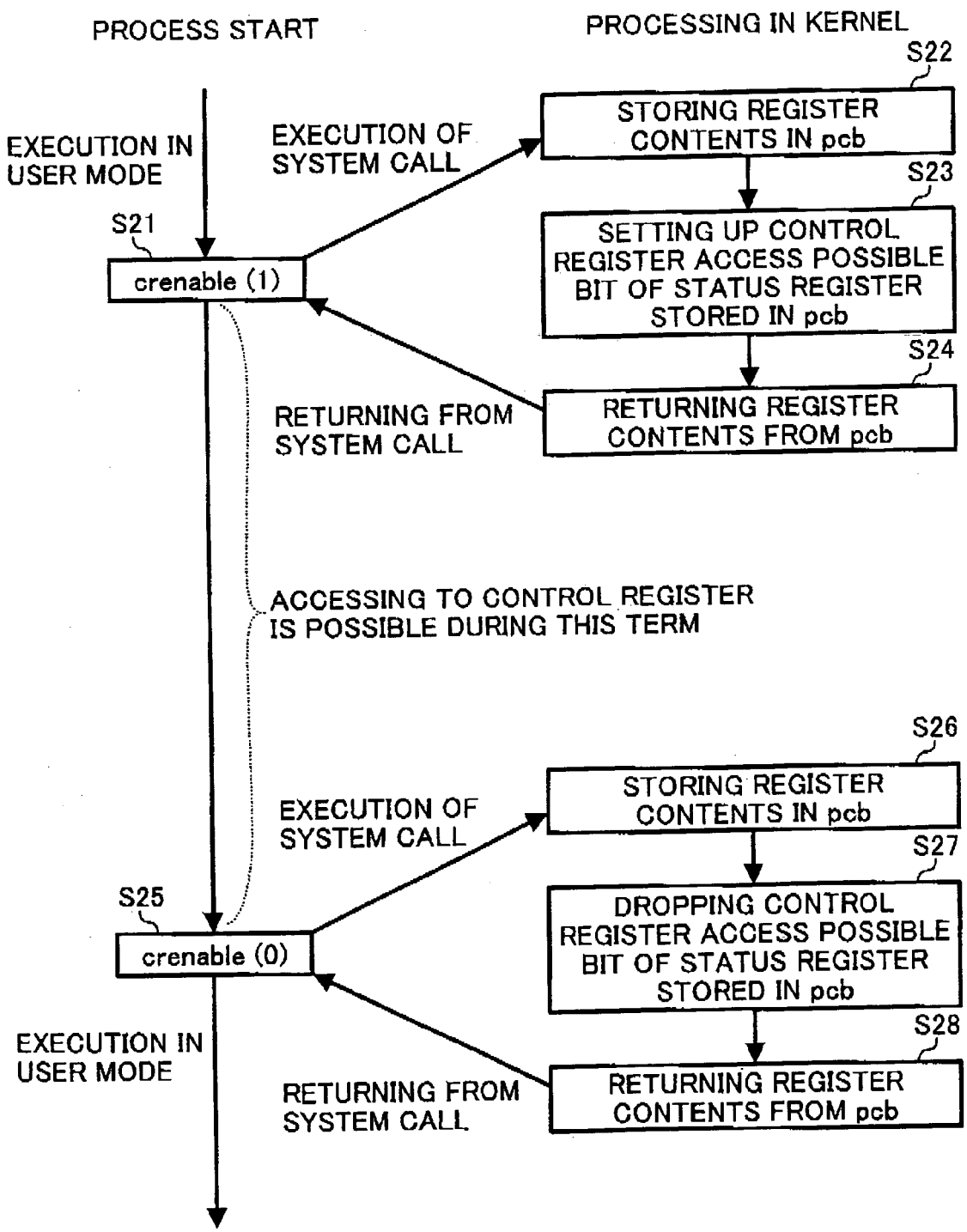
FIG. 10 illustrates exemplary processing executed when a mode is moved to a control register enable mode and returned to an ordinal user mode.

FIG. 10 illustrates exemplary processing of moving to a control register enable mode and returning to an ordinal user mode.

As shown, when it is desired to move to a control register enable mode when a user process is executed in an ordinal user mode, a system call of "crenable (1)" corresponding to a control register mode control function 129 is executed in step S21.

In response, the exception handler 122 executes processing. However, as mentioned above, the user mode setting section 123, also the user system mode setting section 125, does not execute any processing, and the next register content storing section 124 stores register contents of the CPU 141 into a register storage section 135 in step S22.

Then, a control register mode control function 129 of the system call routine 127 is executed, and causes a value of a register mode control bit 137 of the register storage section 135 to indicate as being accessible in step S23.

Then, the process returns to the exception handler 122 (FIG. 3). The register content returning section 126 returns the register contents of the CPU 141 (FIG. 5) from the process control block 133 in step S24, and thereby returning the process into the user process.

Thus, movement to the control register enable mode is completed, and a status register or the like can be freely accessed even in the user process thereafter.

Further, when it is desired to return from a control register enable mode to an ordinal user mode, a system call of "crenable (0)" corresponding to a control register mode control function 129 is executed in step S25.

In response, the exception handler 122 executes processing. The register content storing section 124 stores register contents into the register storage section 135 in step S26.

Then, a control register mode control function 129 of the system call routine 127 is executed, and causes a value of a register mode control bit 137 of the register storage section 135 to indicate as being accessible in step S27.

Then, the process returns to the exception handler 122. The register content returning section 126 returns the register contents of the CPU 141 from the process control block 133 in step S28, and thereby returning the process to the user process. Thus, the ordinary user mode is returned from the control register enable mode.

FIGS. 11 to 19 specifically illustrate processing executed in the above-mentioned user system mode and control register enable mode in an image forming apparatus.

Figure 11:
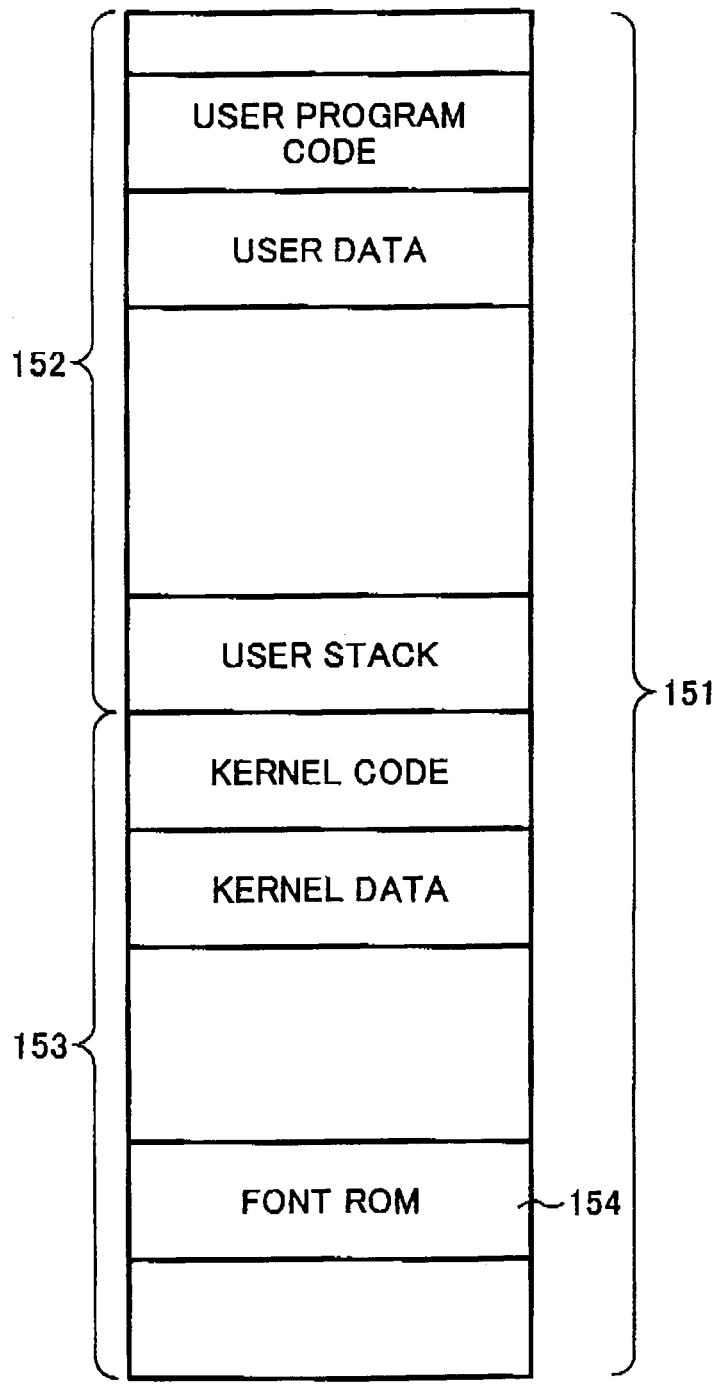
FIG. 11 illustrates an exemplary storage region of a font ROM of a printer.

FIG. 11 illustrates an exemplary storage region of a font ROM of a printer. As shown, all of address spaces 151 are accessible in a kernel mode. However, only an address space 152 assigned to a user process via a virtual memory space is enabled to be accessible in a user mode. A font ROM 154 of the printer is stored in an address space 153 not accessed in the user mode. Conventionally, since a user process can be operated only in a user mode, it was impossible for the user process to directly access to the font ROM 154, thereby causing a memory access problem. However, it can be possible to optionally access to an address and the font ROM 154 directly by moving to a user system mode upon need.

Figure 12:
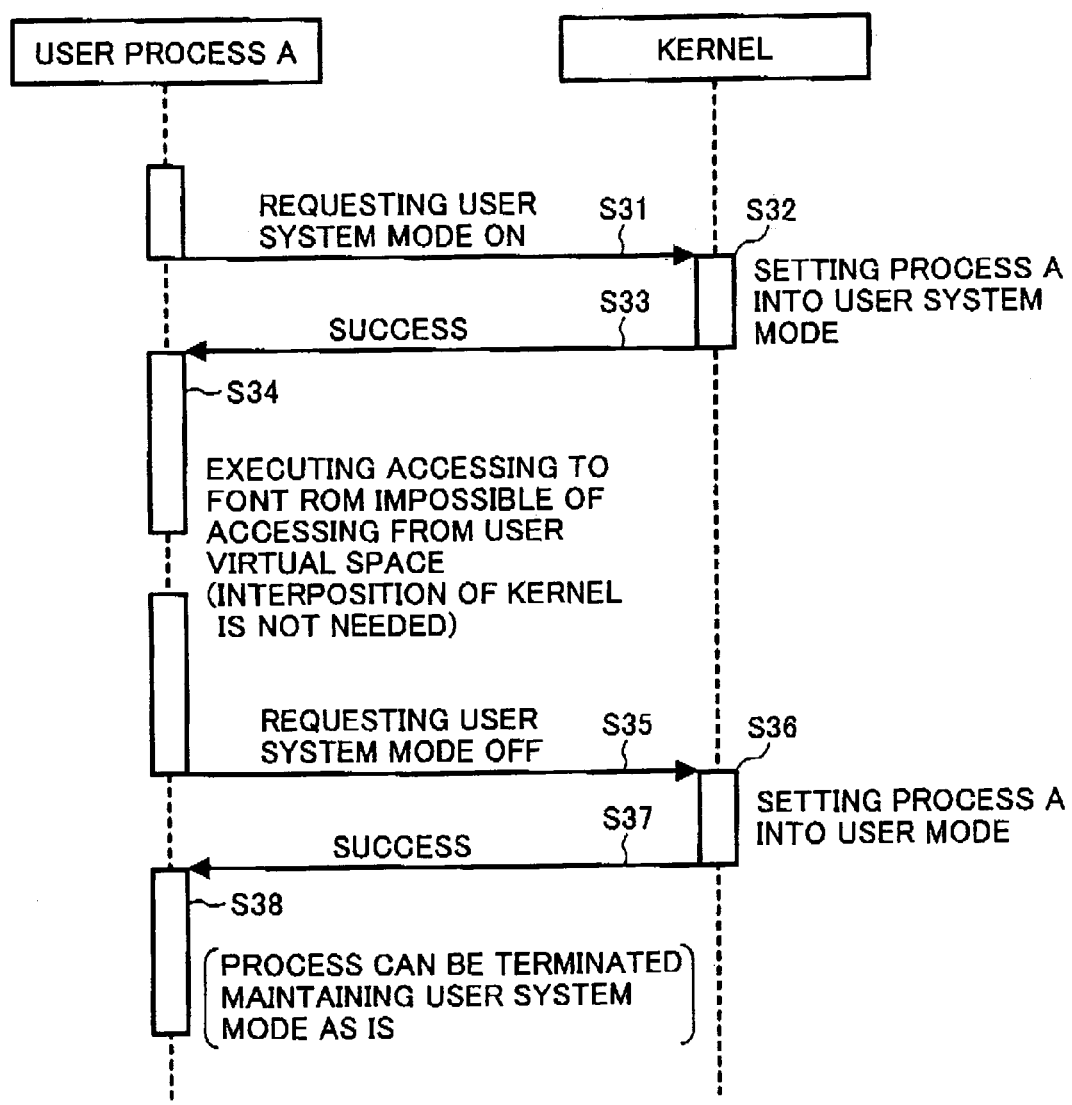
FIG. 12 illustrates an exemplary sequence of processing executed when the font ROM of the printer is accessed.

FIG. 12 illustrates an exemplary sequence of processing executed when a font ROM of a printer is accessed. As shown, when movement to a user system mode is requested to a kernel by a user process A in step S31, the kernel sets the user process A to a user system mode in step S32. If it is successful in step S33, the user process A becomes able to access to the font ROM 145 (FIG. 11) in step S34, which was impossible in an ordinary user mode.

Further, since unfair memory access possibly occurs due to bug or the like of program if a user system mode needlessly continues, the user process A requests the kernel to return to an ordinal user mode when the user system mode becomes needless in step S35. The kernel then sets the user process A to a user mode in step S36. If it is successful in step S37, the user process A operates in the ordinary user mode in step S38.

In such a situation, however, since the user system mode disappears at the same time when the user process A is terminated, the user process A can be terminated maintaining the user system mode if there is no processing in the ordinary user mode thereafter.

Figure 13:
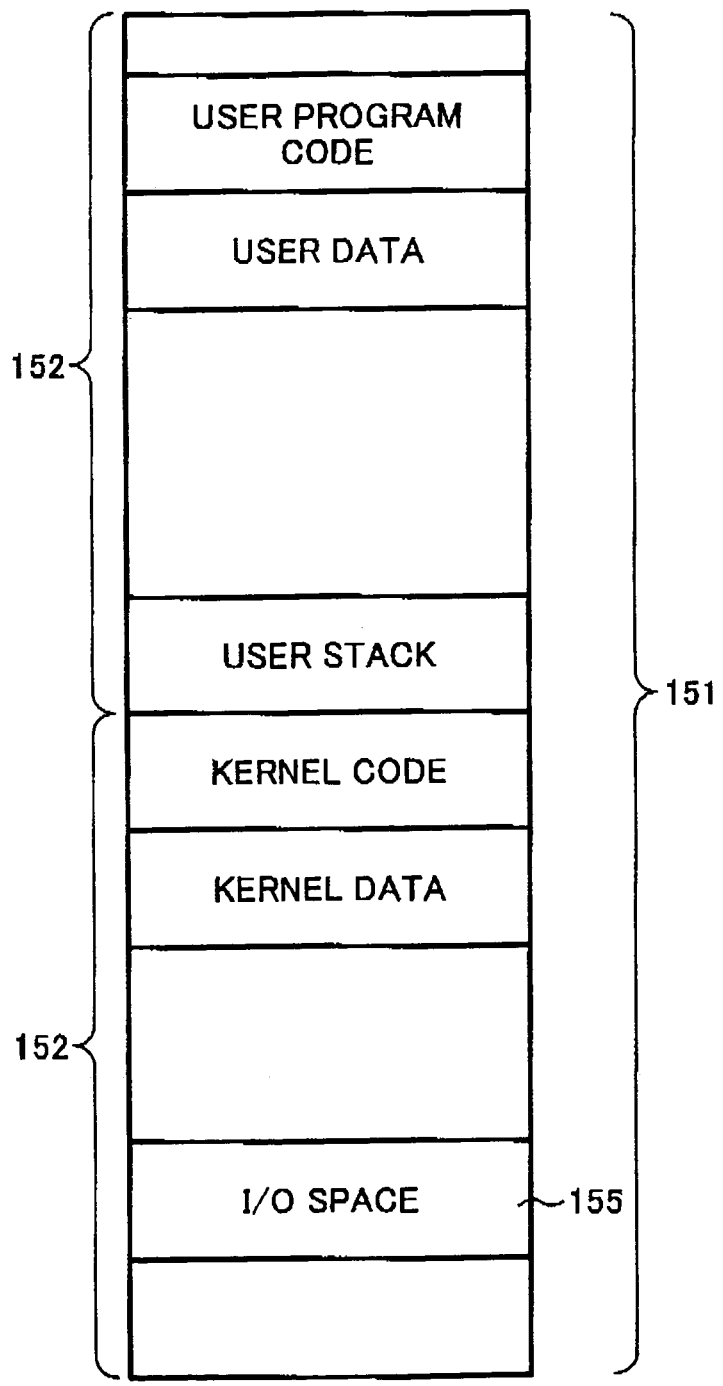
FIG. 13 illustrates an exemplary storage region of data of an I/O apparatus.

FIG. 13 illustrates an exemplary storage region of data of an I/O apparatus. As shown, all of address spaces 151 are accessible in a kernel mode, while only an address space 152 assigned to a user process via a virtual memory space is enabled to be accessed in the user mode. Data of the I/O apparatus is stored in an address space 153 not accessible in the user mode. Conventionally, since a user process can be operated only in a user mode, and was impossible for the user process to directly access to the I/O space 155, thereby causing a memory access problem.

However, it can be possible according to one embodiment of the present invention to optionally access to an address and the I/O space 155 directly by moving to a user system mode upon need.

Figure 14:
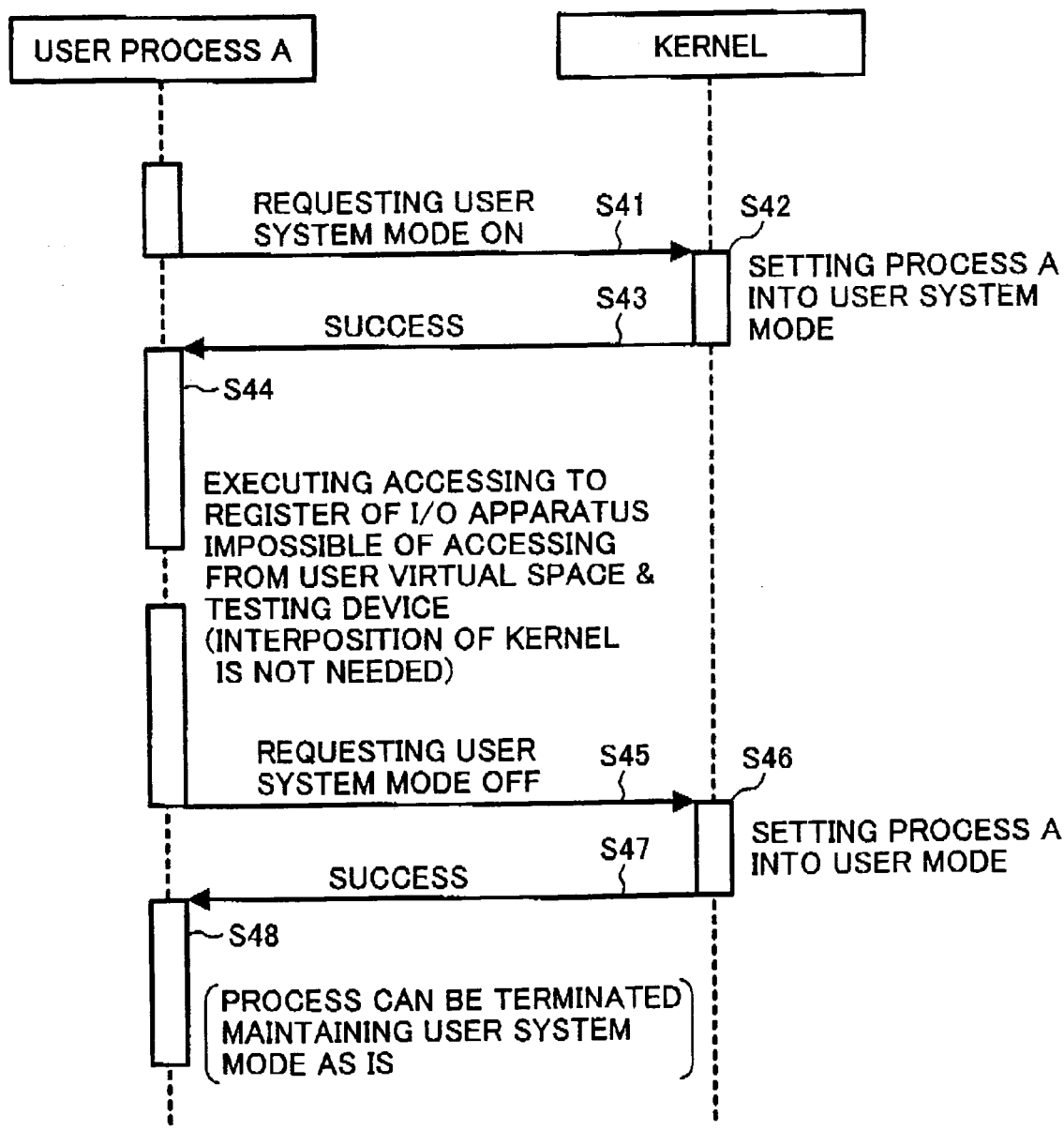
FIG. 14 illustrates an exemplary sequence showing processing executed when data of the I/O apparatus is accessed.

FIG. 14 illustrates an exemplary sequence of processing executed when data of an I/O apparatus is accessed. As shown, when movement to a user system mode is requested to a kernel from a user process A in step S41, the kernel sets the user process A to a user system mode in step S42. If it is successful in step S43, the user process A becomes able to access to the I/O space 155 without intervening of the kernel in step S44, which was impossible in an ordinary user mode. Thus, testing or the like of the I/O apparatus (e.g. a device) can be simply executed by a user program that is readily created and debugged. In particular, since a substantial debug tool becomes available for a user program, a developing term can be significantly reduced if a prototype of a device driver is created as a user program.

In contrast, since unfair memory access possibly occurs due to bug of the like of a program if a user system mode needlessly continues, the user process A requests the kernel for returning to an ordinal user mode when the user system mode becomes needless in step S45. The kernel then sets the user process A to a user mode in step S46. If it is successful in step S47, the user process A operates in the ordinary user mode in step S48.

In such a situation, however, since the user system mode disappears at the same time when the user process A is terminated, the user process A can be terminated, as it is, maintaining the user system mode if there is no processing to be executed in the ordinary user mode thereafter.

FIGS. 15A and 15B collectively illustrates an example that measures an execution time period using a control register enable mode, wherein the example is sometimes used in measuring a performance of a program and detecting a bottleneck.

FIG. 15A illustrates an exemplary program code 161 described with a system call "gettingmemory( )" without using a control register enable mode that is only conventionally used. Specifically, respective times are obtained from formulas 162 and 163, and a difference therebetween are then obtained, thereby an execution time period required therebetween is measured. However, since the system call "gettingmemory( )" is a system call with a large overhead, the execution time period is difficult to precisely measure, and it sometimes gives ill influence to the entire processing performance when frequently being used.

However, a count register "countreg" of a CPU, which maintains time information, can be directly accessed by using a control register enable mode according to one embodiment of the present invention. Thus, a time can be measured without a system call having a large head.

FIG. 15B illustrates an exemplary program code 165 that measures a time in a control register enable mode.

Specifically, a function of "read_countreg" that directly reads a value of a count register is executed at each of the formulas 166 and 167, and a difference therebetween is obtained, thereby an execution time period required therebetween is measured.

Figure 16:
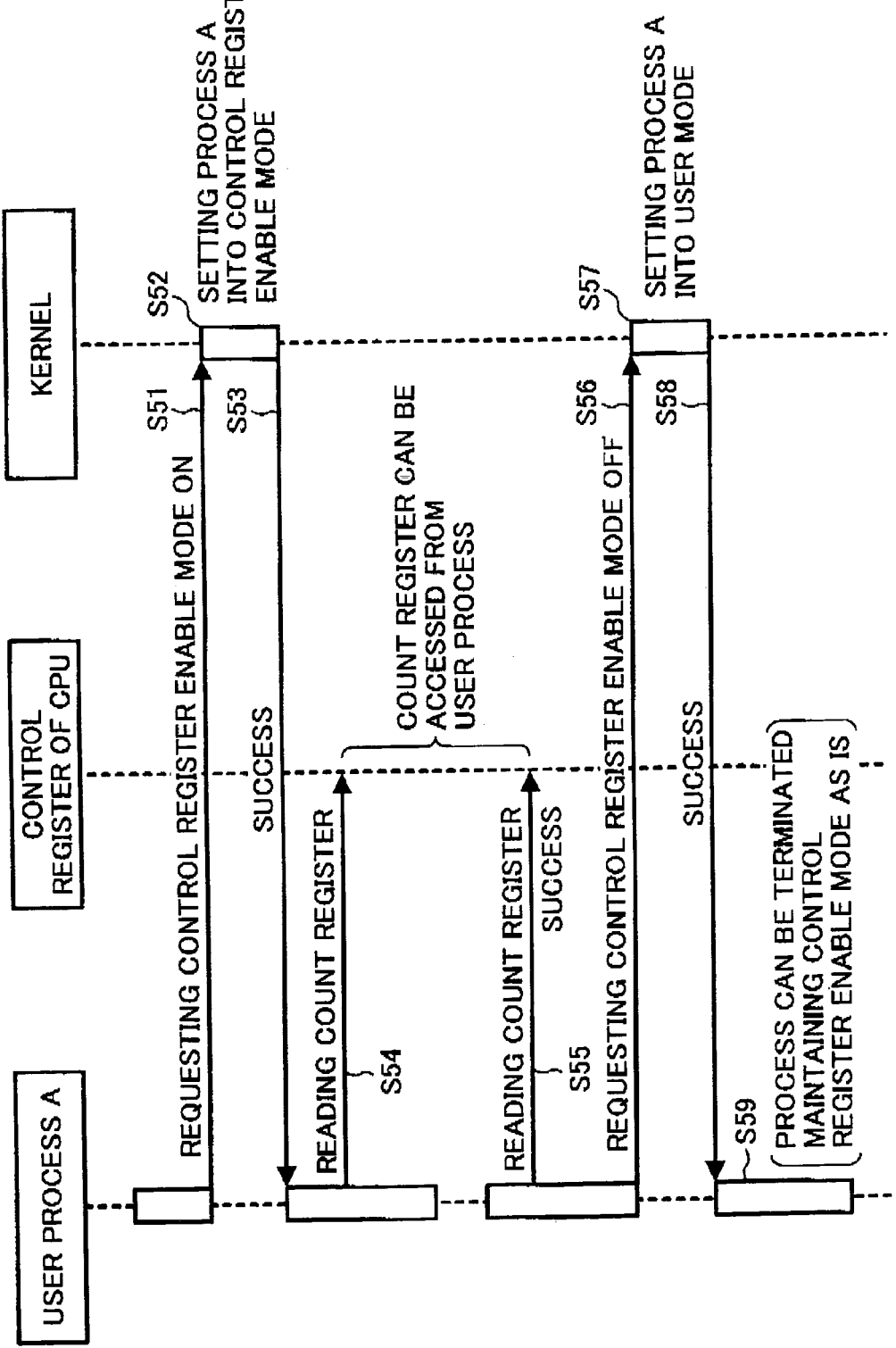
FIG. 16 illustrates an exemplary sequence of processing executed when an execution time period is measured.

FIG. 16 illustrates an exemplary sequence of processing executed when the above-mentioned execution time period is measured. As shown, when the user process A requests a kernel for movement to a control register enable mode in step S51, the kernel sets the user process A to a control register enable mode in step S52. If it is successful in step S53, the user process A becomes able to read the count register, which was impossible in an ordinary user mode in steps S54 and S55.

After that, when the user process A requests the kernel for movement to an ordinary user mode in step S56, the kernel sets the user process A to a user mode in step S57. If it is successful in step S58, the user process A operates in the ordinary user mode in step S59.

In such a situation, however, since the control register enable mode disappears at the same time when the user process A is terminated, the user process A can be terminated as is maintaining the control register enable mode if there is not any processing in the ordinary user mode thereafter.

Figure 17:
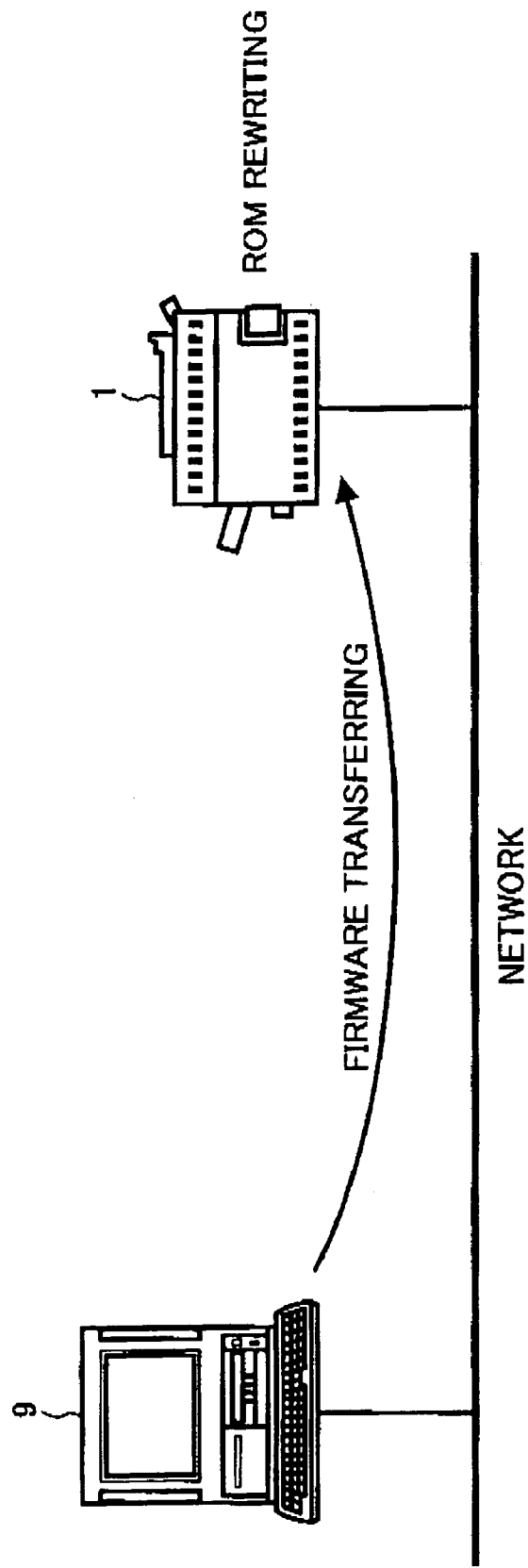
FIG. 17 illustrates an exemplary configuration of an instrument that remotely updates a ROM.

FIG. 17 illustrates an exemplary instrument that remotely updates a ROM (e.g. a Flash ROM) included in an image forming apparatus 1 with a firmware received from a PC 9 via a network. Since a malfunction occurs if a processing moves to another one during the updating of contents of the ROM, the updating needs to be continued. However, interruption is conventionally not directly inhibited from a user program, and is difficult, thereby causing a continuous execution problem. In view of this, a control register enable mode according to one embodiment of the present invention is used and an interruption mask of a status register of a CPU is inhibited to interrupt. Accordingly, the continuous execution problem can be readily avoided. A user system mode can similarly handle the interruption mask instead of the control register enable mode. However, it is safer to use the control register enable mode only for that purpose, because unfair accessing to a memory or the like can be suppressed.

FIG. 18 illustrates an exemplary sequence of processing executed when a ROM is remotely updated. As shown, when a firmware is transferred to a ROM updating module via a network protocol of a kernel from a PC in steps S61 and S62, the ROM updating module maintains the firmware on a user memory in step S63.

In this situation, when a ROM updating instruction is given to the ROM updating module via the network protocol of the kernel from the PC in steps S64 and S65, the ROM updating module requests the kernel for movement to a control register enable mode in step S66. The kernel then sets a process of the ROM updating module to the control register enable mode in step S67.

If it is successful in step S68, the ROM updating module changes the interruption mask of the system register of the CPU into an interruption inhibition state in step S69.

Then, the ROM updating module controls a ROM update runtime library to update the ROM in step S70, and the ROM update runtime library writes a firmware installed in the memory into the ROM in step S71. In this situation, since all kinds of interruptions are inhibited, an event such as a clock interruption, etc., is not conveyed to the kernel, the ROM update runtime library is not interrupted to execute and able to write in the ROM.

When the ROM has been updated, the ROM update runtime library responds such an effect to the PC via the network protocol of the kernel in steps S72 and S73. Then, ROM update runtime library requests the kernel for restarting of a system in step S74, and the kernel restarts the system in step S75. As a result, the firmware updated in the ROM becomes effective.

FIG. 19 illustrates exemplary cache processing executed when an image memory is cleared.

When data writing is to be performed from a CPU 171 as an ordinal writing processing performance in step S81, the writing is not practically executed at the time. Specifically, data having one cache line size including data of an address of a writing objective is read from a memory 173 into a cache 172 (as write allocate processing) in step S82. Then, the data is written to the cache 172 in step S83. Further, one cache line size data is written from the cache 172 into the memory 173 (as write back processing) before the cache 172 is reused, in step S84.

When a memory having 32 bytes is to be cleared in an environment in which 4 bytes can be written per one instruction and a cache line size is 32 bytes using the above-mentioned processing, the below described processing is performed.

As a first step, "0" having 4 bytes is to be written, but is not practically written at this point. As a second step, one cache line having 32 bytes is read from a memory. As a third step, "0" having 4 bytes requested in the first step is written into the cache line. As a fourth step, the next "0" having 4 bytes is immediately written into the cache line. AS a fifth step, processing similar to the fourth step is repeated by six times. It is desirous to simply write "0" into the memory as a memory clear processing. However, write allocate processing of the second step is executed at first write timing, and accordingly, data having one cache line size is unavoidably read from the memory. Since "0" overwrites the read data shortly, reading of the data is wasteful. Then, if the reading is omitted, memory clear processing can be performed at a high speed. It is the same when data is copied.

The "write allocate" processing can be skipped while executing a "SET_DIRTY_EXCLUSIVE" instruction included in a cache instruction, prepared in a CPU of a MIP type, and causing the cache line to be a dirty state. However, since this instruction is a privilege instruction and impossible to be executed in a user mode, it cannot be conventionally utilized, thereby a cache problem is raised.

In view of this, the "SET_DIRTY_EXCLUSIVE" instruction or the like can be executed from a user process and thereby memory clearing processing or the like can be performed at a high speed, if a user system mode or a control register enable mode according to one embodiment of the present invention is utilized. Further, since a cache is regarded as a type of a register, a cache instruction serving as a privilege instruction becomes usable even though the control register enable mode is not permitted to generally use a privilege instruction.

The following processing is executed when a mode is changed to either the user system mode or the control register enable mode and a memory having 32 bytes is cleared in an environment in which a cache line size is 32 bytes and 4 bytes are written per one instruction.

In a first step, a cache instruction is executed as to an address to be cleared and set the address to be a "dirty" state. As a second step, "0" having 4 bytes is immediately written into a cache line. As a third step, the next "0" having 4 bytes is immediately written into the cache line. AS a fourth step, processing similar to the third step is repeated by six times. Thus, the "write allocate" processing can be skipped by using either the user system mode or the control register enable mode. As a result, memory clear processing can be performed at a high speed.

Numerous additional modifications and variations of the present invention are possible in light of the above teachings. It is therefore to be understood that within the scope of the appended claims, the present invention may be practiced otherwise that as specifically described herein.

What is claimed is:

1. An image forming apparatus connected to an external instrument, said image forming apparatus comprising:
a CPU configured to execute general control, said CPU including a control register and a status register;
a ROM configured to store data;
a memory configured to store data;
a firmware maintenance device configured to accept firmware for updating the ROM transmitted from the external instrument via a kernel of an operating system configured to control the image forming apparatus, said firmware maintenance device maintaining the firmware on the memory;
a mode transition requesting device configured to request the kernel to execute transition to a control register enable mode that enables direct access by means of a user process in relation to the control register in a user mode upon receiving a ROM update instruction from the external instrument via the kernel;
a condition transition device configured to change an interruption mask of the status register and execute transition to an interruption inhibition condition upon receiving a positive response from the kernel such that the control register enable mode is successfully entered;
a writing device configured to write the firmware maintained on the memory into the ROM after the interruption inhibition condition is entered; and
a system restart requesting device configured to request the kernel to restarts a system of the image forming apparatus after the writing of the firmware into the ROM is completed.

* * * * *